United States Patent [19]
Hunzinger

[11] 3,947,086
[45] Mar. 30, 1976

[54] DEVICE FOR TILTING A FIELD IN AN OPTICAL SYSTEM

[75] Inventor: Jean-Jacques Hunzinger, Paris, France

[73] Assignee: U.S. Phillips Corporation, New York, N.Y.

[22] Filed: Dec. 9, 1974

[21] Appl. No.: 531,085

[30] Foreign Application Priority Data
Dec. 13, 1973 France .............................. 73.44573

[52] U.S. Cl. .................................. 350/36; 350/286
[51] Int. Cl.² G02B 21/20; G02B 23/00; G02B 5/04
[58] Field of Search .......... 350/36, 37, 48, 49, 145, 350/146, 286, 287, 185, 175 VP, 90, 92, 170

[56] References Cited
UNITED STATES PATENTS

| | | | |
|---|---|---|---|
| 2,428,797 | 10/1947 | Gardner | 350/36 |
| 3,353,892 | 11/1967 | Minns et al. | 350/36 |
| 3,790,267 | 2/1974 | Ramberg | 350/286 |

*Primary Examiner*—Alfred E. Smith
*Assistant Examiner*—Jon W. Henry
*Attorney, Agent, or Firm*—Frank R. Trifari; Simon L. Cohen

[57] ABSTRACT

A single entrance prism and two symmetrical second prisms divide the radiation from an object into two light paths and angularly correct the rotation of the image planes for a binocular viewing system.

7 Claims, 5 Drawing Figures

DEVICE FOR TILTING A FIELD IN AN OPTICAL SYSTEM

The invention relates to a device for varying the inclination of the object field or the image field relative to the optical axis in an optical system.

The performance of an optical system may be appreciably limited owing to the fact that a field in said system, which field is for example plane, is not transverse to the optical axis. Therefore, it may be desirable when designing optical equipment in which the field appears to be inclined relative to the optical axis, to modify the position of said field so that it is normal to said axis.

In practice this is for example the case with the binocular observation of objects of which the object field is at the same time inclined and symmetrical relative to each of the axes of the two optical paths.

The opposite may also occur: the object field may originally be disposed normal to the optical axis, while in view of the function to be performed by the system the image of the field must be inclined relative to the normal said axis.

More in general, the problem may occur that an image field has a different inclination relative to the optical axis of the image than the object field relative to the corresponding optical axis.

Hereinafter, the inclination of the field, which for simplicity is assumed to be a plane field, is characterized by the angle which the normal to said plane makes with the optical axis, and it is an object of the invention to provide means of varying said angle in optical systems when passing from the object space to the image space and vice versa. Said variation is denoted by the term "tilting of the field".

Tilting of the field is a phenomenon which generally occurs in optics and which is necessarily found in the prior art although it is in general not explicitly mentioned.

Figure 1:
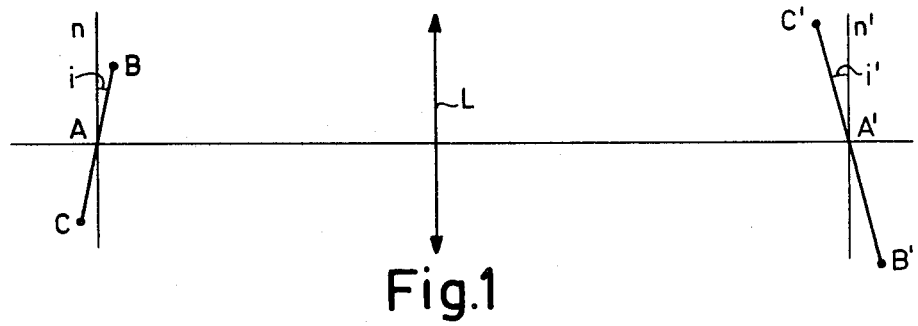

For example, in an optical system as shown in FIG. 1, which is one of the simplest systems, the object field BAC makes an angle $i$ with the normal $n$ to the axis AA' in A in the plane of the drawing, while its image B'A'C' makes an angle $i'$ with the normal $n'$ to the same axis in A', which generally differs from $i$. The line BOC represents the plane of an object, while line B'O'C' represents the plane of an image of the object. Essentially, $i$ and $i'$ are related by the expression $i' = g\ i$, $g$ being the magnification of the lens L which corresponds to the conjugate points A and A'.

From said relation it is evident that one of the quantities $i$ and $i'$ cannot be zero if the other is not zero, unless the magnification $g$ is zero, which implies that the power of the objective is infinite if the field is not located at an infinite distance. Apparently, such a system is not capable of arranging an initially oblique field transverse to the normal ($i' = 0$).

Moreover, to obtain a given inclination, i.e. a given tilting angle, an accurate magnification of the field is necessary, which may be undesirable. The conclusions would be the same for any other less schematic uniaxial optical system. Apart from the drawbacks as a result of aberrations which can be introduced in the image formation by such an optical system, said system only provides a solution to the problem of tilting under certain, sometimes annoying or compulsory conditions, or provides no solution at all, especially in the important case in which the field is oriented normal to the optical axis.

Other optical elements which can tilt the field include the refracting prism.

In the prior art the radiation refracting prism is employed in optical devices, but this is because of another property of the prism, namely that of the deflection of a beam. Although deflection and tilting occur at the same time, it is surprising that only the phenomenon of deflection has been untilized, whereas the phenomenon of tilting has never been employed and has apparently been ignored, annoying though it may have been at times. It is also remarkable to find that those skilled in the art, who accept and adapt themselves to the problems of the tilting caused by the prism, generally utilize said tilting in very special circumstances, that are compulsory in respect of the position which is assumed by the object field relative to said prism: to obtain a highly anastigmatic image field, the plane of the object field must pass through the refracting edge of the prism. In practice, said requirement makes it necessary that the location of the prism coincides with that of the object field, so that it is not possible to use a prism when the nature of the problem to be solved prohibits coincidence. This is for example the case when the object field must be common to two optical systems whose axes converge towards the center of the field, the inclination of the field is then assumed to be different for each of said axes and the prism which like the field has to be common for the two systems, cannot satisfy two incompatible functions.

Said remark applies in particular to binocularvision systems of the telescope-type, which naturally comprise two symmetrical optical paths and which are the subject of the present invention. For systems of this type, said inclination, as function of the observed point, results in a variable focussing error, which owing to the symmetry of the two paths manifests itself to the observer as variations of the accommodation which variations are opposite for each eye, a point of the field being in front of and behind the object focal plane for one eye and the other eye respectively. Said error is permissible only for the observer when it remains below a certain limit, which is a function of the apparent field of the instruments, so that it is maintained at comparatively small values.

In contradistinction to the prior art, the invention is concerned with mastering the problem of tilting of a field in optics, and with methods and means which cause said tilting because of their conscious and systematic use in optical instruments. The said methods and means are designed so as not to restrict their use to some particular cases.

For this, the invention pursues several objects. One of these objects is to accomplish tilting of a field without changing or affecting the magnification of the instrument.

Another object of the invention is to effect said tilting in such a way that a field which was initially inclined relative to the optical axis is restored to a position normal to said axis.

A further object of the invention is moreover to provide an element, as a means of tilting, which need not be disposed in the vicinity of said field, so as to allow, in contradistinction to the prior art, the same field to be used for several optical systems or optical paths, each of which may comprise an appropriate tilting element.

To accomplish said objects the invention utilizes a refracting prism. The invention pays special attention to the tilting caused by said prism, employing the deflection which necessarily accompanies said tilting, which deflection is not the only property which is utilized and considered as in the prior art, but which is applied in connection with the effects associated with tilting.

The invention determines the conditions of use of said prism for which the concept of tilting is accurately defined and can subsequently be the object of an embodiment and may be utilized.

The prism which is employed according to the invention may have a refractive index which is smaller or greater than that of the envireonment in which it is disposed. It may in particular consist of glass prism disposed in air or, conversely, an air prism disposed in glass.

Moreover, the refractice index of the medium in which the prism is disposed may differ at the entrance and at the exit of the prism. Although all theories and considerations which have lead to the invention are based on a plane field, because the prism which is used itself does not introduce any curvature of field, the invention also concerns and is applied to curved object fields, whose curvature is maintained in the image independently of the tilting.

As will be explained hereinafter, the invention ultimately leads to a device for tilting a field, use being made of a refracting prism with a small apex angle of the order of maximum one third of a radian and the entrance pupil being at infinity or very remote, the field being located at a finite arbitrary distance from the prism and the angle of incidence of the beam being substantially equal to that which corresponds to the minimum deviation caused by the prism.

The prism according to the invention is for example an air prism disposed in glass or a glass prism disposed in air.

The invention may also be applied to devices which are known per se for varying the field inclination relative to the optical axis.

A special application of the invention is concerned with devices for binocular vision having two distinct optical paths, for which the object field is necessarily inclined differently relative to each of the axes of said paths.

The invention in particular provides a new type of binocular telescope.

Figure 2:
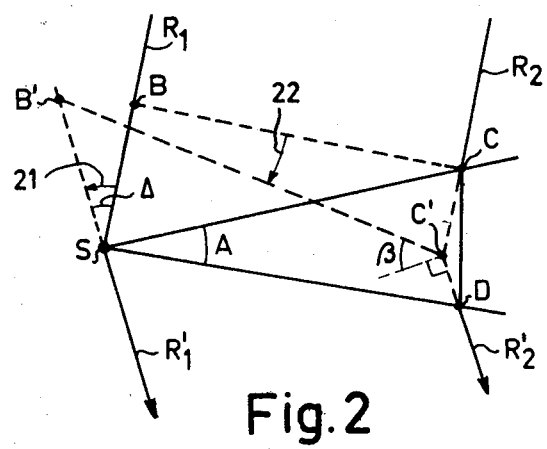
Figure 3:
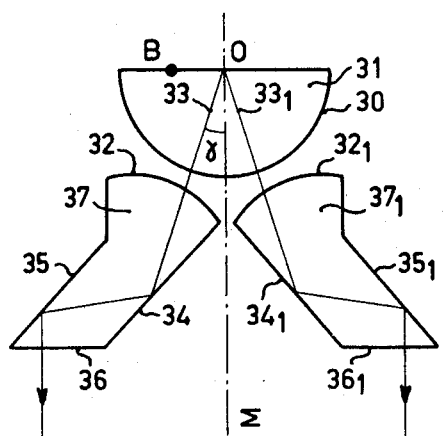
Figure 4:
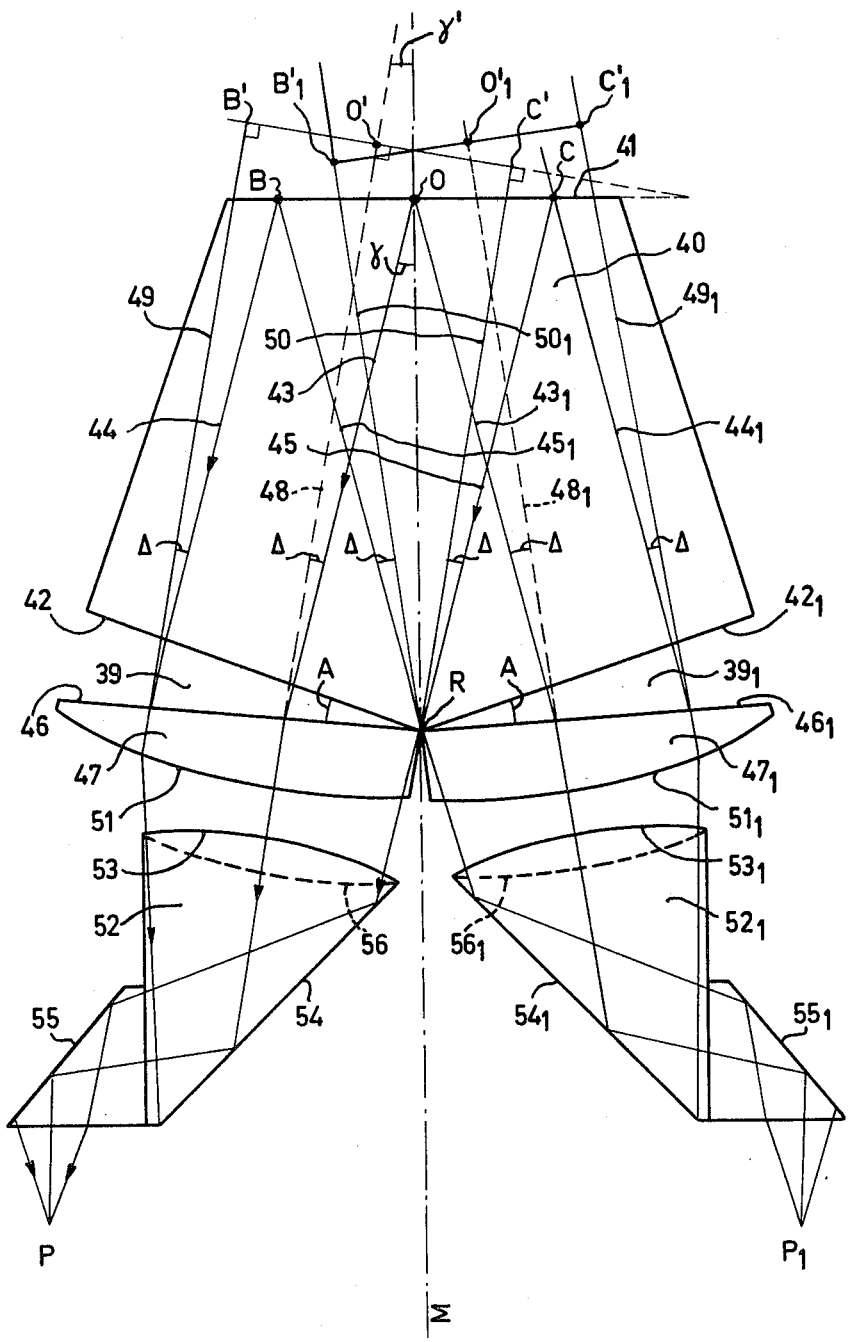
Figure 5:
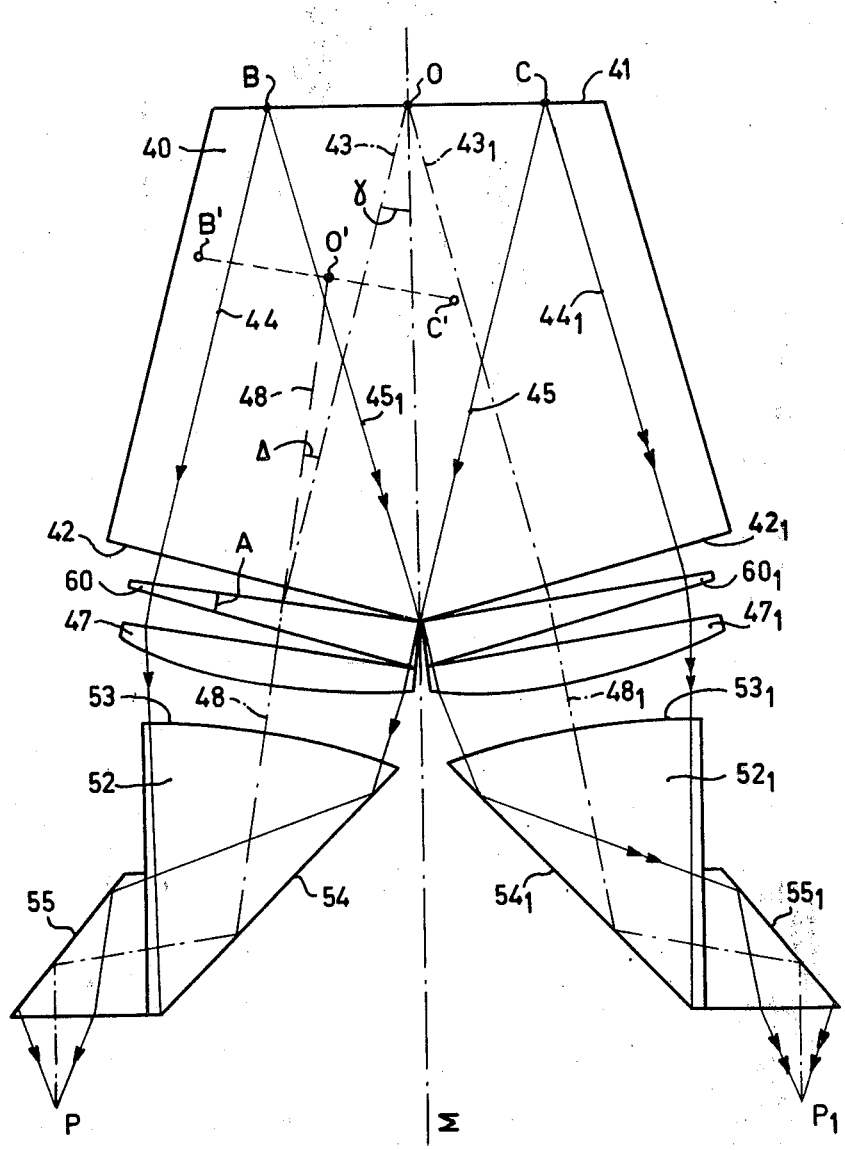

The invention is explained with the aid of the following physical and technical considerations with reference to the drawing, in which:

FIG. 1 illustrates the tilting caused by an optical system consisting of a lens, FIG. 2 shows the tilting caused by a prism which is used according to the invention, FIG. 3 shows a known binocular lens, FIG. 4 shows a first embodiment of a binocular lens according to the invention, and FIG. 5 shows a second embodiment of a binocular lens according to the invention.

The basic optical properties of the radiationrefracting prism such as deviation, minimum deviation, astigmatism of a pencil of light, magnification, dispersion etc. have already been comprehensively described in publications in the field of optics. However, in said publications the tilting of a field is not discussed. The reason of this is that the concept of tilting is rarely of any significance, because the image formed by a refracting prism generally exhibits astigmatism and there is in fact no longer one image field but two: the sagittal field and the meridianal field. Furthermore, said two fields generally no longer have the same curvature as the object field and do not have the same inclination relative to the refracted optical axis, so that the tilting is merely an ambiguous concept and also a quantity which varies depending on the conditions of use.

The prime object of the invention is to precisely define said concept. Thus, the device according to the invention must provide an image of the object field which is substantially astigmatism-free for all points of the field and for an arbitrary distance of said points to the object.

In accordance with a first step according to the invention the prism functions with an entrance pupil at infinity in such a way that the chief rays are parallel to each other and thus parallel to the optical axis (which is merely a specific chief ray), the angle of incidence of said rays furthermore being such that it corresponds to the minimum deviation of said prism.

A second step according to the invention concerns the angle of refraction of the prism. Said step is dictated by the fact that the astigmatic difference $\mathscr{A}$ of a pencil of light which is refracted by a prism can be expressed for a point of the field by two terms of the following relation:

$$\mathscr{A} = F.x - G.e \qquad (1)$$

In this equation F and G are functions which include the refractice indices of both the prism and the medium surrounding it, and the angle of incidence of the beam at the prism surfaces, while $x$ and $e$ respectively represent the distance from the object point to the prism and the distance which the beam traverses in the prism for said object point.

Since the prism operates with the minimum deviation, F equals zero for any point of the field and the astigmatism can only depend on $e$. By selecting a small angle of refraction for the prism according to the invention, $e$ will be small in any point, and also the product G.e because $G \ll 1$. Thus, it may be assumed that conditions for the prism are obtained in which at the minimum deviation the astigmatism is zero in any point of the field and independent of the position of the field relative to the prism, so that according to the invention said field may then be located at an arbitrary distance from the said prism.

FIG. 2 schematically represents an embodiment of the device for tilting a field according to the invention. Said Figure moreover enables the tilting which is obtained to be calculated.

In said Figure C S D is a principal section of the prism which provides the tilting. It is assumed that said prism has a refractice index which is greater than that of the surrounding medium. S is the apex of said principal section. The entrance pupil of the prism is disposed at infinity in the direction of the paraxial rays $R_1$ and $R_2$ of the pencil of light, which is subject to the minimum deviation in the prism, said rays being disposed in the plane of the drawing. $R_1$ passes through the apex S of the prism. BC is the intersecting line with the plane of drawing of a plane object field which is perpendicular to the paraxial rays $R_1$ and $R_2$. The images B' and C' of the points B and C formed by the prism are located in the prolongation of the rays $R'_1$ and $R'_2$ which are refracted by the exit face SD of the prism. As BC is normal to $R_1$ and $R_2$, the field has an inclination of zero according to the terminology which has been adopted.

However, the inclination of the image B'C' of said field relative to the refracted rays is not zero; the angle $\beta$ which B'C' makes with the common normal to $R'_1$ and $R'_2$ is then precisely the requested variation of the inclination, i.e. the angle through which the object field BC is tilted relative to any of the median rays, thus also relative to the optical axis. The value of said angle is readily found, by assuming its value to be equal to its tangent:

$$\beta = (n - 1/n) A \qquad (2)$$

where A is the top angle of the prism and $n$ the ratio of the refractive index of the prism relative to that of the surrounding medium.

It is to be noted that said tilting is always greater than the minimum deviation $\Delta = (n-1) A$, which is caused by the prism and that the direction of rotation of the field is opposed to that of the deviation, as is indicated by the arrows 21 and 22. Thus, according to the invention, the combined effects of the rotation and the deviation of the field provide a variation of the inclination of the field relative to the optical axis.

On the other hand, it is evident that the tilting angle will not change, when point B moves along the ray $R_1$, i.e. when the object field is no longer normal to the optical axis, or in other words the tilting angle is independent of the position of the object field relative to the prism.

Furthermore, according to the principle of reversal of the light path, the roles of object and image may be interchanged, which reveals that according to the invention an object field B'C' which is inclined can be restored to a position normal to the optical axis in the direction BC.

According to another embodiment the method may also utilize an air prism which is disposed in glass. The object and the image field are then disposed in glass and the tilting which then occurs is then given by the same expression, $n$ being the refractive index of the glass which surrounds the air prism.

The invention provides an embodiment of the method for which the surrounding medium at the entrance and at the exit of the prism is not the same. The formula which gives the astigmatism is then more intricate, but there is still a specific angle of incidence at the entrance face of the prism for which the astigmatism is low and independent of the distance of the field to the entrance face, while moreover the field is tilted.

The tilting method according to the invention, which to simplify the present description has been assumed to relate to plane field only, also relates to curved fields. Under the afore-mentioned conditions of use the prism does not introduce any field curvature. Thus, the method according to the invention allows a curved field to be tilted, the original curvature of the field being maintained.

The invention also relates to the application of said method of tilting a field when it is required to vary the inclination of said field.

According to the invention the tilting operation may take place several times without substantially affecting the image, by repeating the method described hereinbefore.

The advantage of tilting a field in optical instruments may be to restore said field to a position normal to the optical axis so as to enlarge the apparent effective field.

This is for example the case in instruments or devices with two optical paths for the binocular vision of objects when the object field in inclined relative to each of the optical axes of the two paths.

The use will now be described of the device which comprises a telescope of the binocular type, without limiting the scope of the invention to the general applications of the device, specifically to binocular vision.

FIG. 3 is a section of said device in accordance with one of its planes of symmetry. The object plane is located at the plane face of a plane-convex lens 31. It is centered in the center of curvature 0 of the second face of said lens, whose thickness for example equals the radius of the refractice spherical face 30 by which it is bounded. $\Sigma$ represents the axis of symmetry of the system, which axis passes through O. At either side of said axis a converging refractice surface 32 and $32_1$ respectively is disposed whose optical axis 33 and $33_1$ respectively passes through the center 0 of the object, the optical axes making an angle with the axis $\Sigma$. After having passed through said refractive face, each of the two beams 33 and $33_1$ propagates in the glass blocks 37 and $37_1$ respectively. The beams are reflected twice at the faces 34, 35 and $34_1$, $35_1$ respectively and reach the eyes via exit faces 36 and $36_1$ respectively. The power of the refractive face is such that for each optical path the object focus of the combination coincides with the center 0 of the object.

Thus, apart from the mirrors, the system comprises for each eye two thick plane-convex lenses, which face each other and which are separated by a narrow air gap, one of said two lenses being common for the two channels of the system.

Such a system has two optical axes which are inclined relative to each other and to the object field. In order to avoid a condition wherein a rectangular object field is observed as a trapezium owing to its inclination relative to the optical axis of each path, it is necessary and it suffices that the entrance pupil is at infinity. Thus, in accordance with a first step according to the invention the entrance pupil — which is materialized by the pupil of the eye — is disposed substantially in the image focus of the combination for each of the two paths.

On the other hand, a point of the object field such as B, which is situated at a distance y from the center 0, is disposed in front of or behind the object focal plane, depending on whether the left or the right eye is considered. By limiting said difference in distance of the same point of the field, which is viewed differently by each eye to a maximum permissible value, for example ½ dispter, the maximum magnitude y of object half-field or of the apparent angular half-field $\alpha'$ (according to tan $\alpha' = y/f$) can be determined as a function of the focal distance f of the system. Calculation yields:

$$\tan \alpha' = n_1 \sqrt{\frac{f}{2000}}$$

with $f$ in mm, $n_1$ being the refractice index of the glass of the sphere 31.

For example, for a focal distance $f = 30$ mm the total angular field 2 $\alpha'$ cannot exceed a value of 25°.

Owing to the step according to the invention said limit of the apparent field is surpassed and increased to values of the order of 40°.

The accomplish this, a radiation refracting prism with suitable field-tilting properties is included in each of the optical paths and applied under the conditions that are required for the use of the device according to the invention. The refractice index of the prism may be smaller or greater than the refractice index of the optical medium which surrounds the prism and use can be made for example of an air prism disposed in glass or a glass prism disposed in air.

To ensure anastigmatism and freedom as regards the position of the object relative to the entrance pupil of the prism (see formula 1), the angle of the prism is chosen small, for example smaller than ⅛ radian, the entrance pupil of the instrument being shifted towards infinity and the angle of incidence at the entrance face substantially corresponding to that for the minimum deviation of the prism.

Owing to refraction at the prism the plane object field is tilted relative to the optical axis in each optical path, said field being tilted in a sense which is opposite to that of the deviation of the beam and of the optical axis caused by said prism. By an appropriate choice of the apex angle of the prism the image of the object field can be restored to a position perpendicular to the optical axis after refraction in the prism. As said tilting and said perpendicular position are obtained in each optical path, the accommodation which is necessary to observe an object point which is remote from the centre of the field is the same for each eye, as a result of which binocular vision is no longer impaired and the field of view is extended.

FIG. 4 shows a section at one of the planes of symmetry of a first embodiment of the invention employing said principle. Use is made of an air prism. $\Sigma$ as in FIG. 3 represents the axis of symmetry of the system, which has two optical paths. In this Figure the elements of the right-hand path are denoted by the same reference numerals as the corresponding elements of the left path, except for the index 1. With a view to the symmetry of the system only the elements of the part which is common for both paths and the elements of the left path are cited and described for the sake of simplicity. The system comprises a glass block 40, which is common for both paths and which has a plane face 41 and two further plane faces 42 and $42_1$ which have a common refractice edge at R. The object field of the device is located at the plane face 41. Said field BOC is centered in point 0, which is the object focus which common for both optical paths. The optical axis is represented by 43 and makes an angle $\gamma$ with $\Sigma$. The rays 44 and 45 emerge from B and C respectively parallel to the optical axis 43. Said optical axis and said rays are deviated through an angle $\Delta$ by the air prism 39 which has an angle of refraction A. Said air prism consists of the two plane faces 42 and 46, 46 being a face of the glass block 47 with the same refractice index as the block 40 and one edge of said block 47 substantially coinciding with the edge of the glass block 40 at R. For a given focal length distance of the system said glass block 40 enables an inclination $\gamma$ of the object field to be obtained, which inclination relative to the optical axis of each path decreases and can thus be corrected more easily be means of the prismatic element 39 according as the refractice index of said block increases.

The object field BOC in the object space has an inclination $\gamma$ relative to the optical axis 43. As it is refracted in the air prism 39 said object field is tilted so that B'O'C', which is an image of BOC, is perpendicular to the optical axis 48 and to the prolongation of the refracted rays 49 and 50, because the angle A of the prism 39 has been selected so, allowing for the infractice index $n_1$ of the glass blocks 40 and 47, that said tilting angle equals the inclination of the optical axis relative to $\Sigma$. The relation between the tilting angle - i.e. $\gamma$ - and the angle A is expressed by the formula (2)

$$\gamma = \frac{n_1 - 1}{n_1} A.$$

After refraction in the prism the optical axis makes an angle $\gamma'$ with $\Sigma$ which angle is $$\gamma' = \gamma - \Delta = \frac{n_1}{n_1 + 1} \gamma.$$

Allowance has been made for the fact that the deviation caused by the said air prism is given by the relation:

$$\Delta = \frac{n_1 - 1}{n_1} A.$$

The point 0' which is the image of the center 0 of the object field after refraction by the prism is taken as the center of curvature of the refracting face 51 by which the glass block 47 is bounded. The optical path moreover includes a glass block 52 which is analogous to the glass block 37 of FIG. 3. The spherical entrance face 53 of said block is centred at the refracted optical axis 48, while the mirrors which follow (for example two), 54 and 55, form a dihedral angle $\gamma'/2$, so that the optical axis will be parallel to $\Sigma$ after being successively reflected at each of said mirrors. Said optical axis with the rays 44 and 45 converges to the point P which is image focus of the optical path and the location of the pupil of the eye.

A system as described may be used for correcting aberrations in accordance with conventional methods of duplication of the refractice faces in each optical pathway. Expecially for the correction of chromatic aberrations the refracting faces 56 and $56_1$ may be included in each ocular, which faces separate for example two materials having the same refractice index but different dispersion, said new refractive faces each being centered at their respective axes, which are refracted by the prismatic elements.

To obtain a short focal length and a large anular field, glass of a high refractice index is chosen, which moreover allows the field curvature to be reduced.

To minimize the astigmatism which is introduced by the prism, tilting should be effected with a prism which has a small top angle A and the surrounding glass should have a high refractice index $n_1$.

In addition, the device according to the invention yields certain advantages with respect to the sharpness of the image:

the spherical aberration is small because the first of the two refractive faces, whose powers are approximately the same, is aplanatic.

the coma is low because the first converging refractive face is aplanatic and the second face has a pupil near its centre of curvature.

For said last-mentioned reason the astigmatism and the field curvature are also small.

The distortion owing to spherical aberration of the pupil remains very low for a 40° field.

The system according to the invention allows focussing at the object owing to the air gap which separates the two spherical faces of each optional path. A simultaneous translatory movement of the oculars with the mirrors in the direction of their optical axes, which make an angle γ' with Σ, enables the object to be observed to be defocussed, so as to adapt the instrument to the eyesight of an observer who is nyopic or hypermetropic, without causing an angular displacement of the two images, whose centers are viewed in a direction which remains fixed even during adjustment.

Moreover, the mutual distance between the pupils may be increased by rotating said oculars about points $0'$ and $0'_1$ respectively through an angle which is for example smaller than 3°, which suffices to vary the mutual distance by some ten millimeters. Said adjustment again results in an inclination of the field relative to the optical axes, but this is so small as not to affect the advantages of binocular vision. Furthermore the axes of the eyes must converge at a finite distance, but said distance is greater than 1.3 meters, which is consequently not annoying.

In a modification of said embodiment the air prism is replaced by a prism of a different material whose refractive index is substantially smaller than that of the glass of which the blocks 40 and 47 are made, which glass is selected allowing for the refractive index of the prism material.

In yet another modification of said embodiment the glass of the block 40 has a refractice index which differs from that of the block 47.

In a further embodiment of the invention, which employs a glass prism disposed in air for tilting the object field, is shown in cross-section in FIG. 5. Similar to the preceding system it has two symmetrical optical paths relative to . Only the left path of the device will be described, as has been done with regard to FIG. 4. In FIG. 5 the elements which correspond to those in FIG. 4 bear the same reference numerals.

FIG. 5 also shows the block 40 of FIG. 4 as well as block 47, which no longer has a common edge with 40. Between the blocks 40 and 47 a glass prism 60 surrounded by air is disposed, the apex angle of the prism being located outside the device.

Owing to the position of said prism 60 and the fact that it is made of glass and disposed in air, it causes a deviation of the beam and a tilting of the object field, each have the same direction as in the first embodiment of the invention.

The glass block 40 is for example arranged so that the optical axis 43 is normal to the exit face 42 of said block.

Furthermore, the prism 60 operates with approximately the minimum deviation for the direction of the optical axis 43 and those of an angular deviation Δ of the optical axis 43 and tilting of the object field BOC occur in opposite directions and in such a way that the image $B'O'C'$ of said object field and the image 48 of the optical axis are at right angles after refraction in the prism 60.

At the exit side of the prism the block 47 is a converging optical system, which consists of at least one lens whose optical axis coincides with the optical axis 48 of the system.

The system moreover comprises the oculars 52 and $52_1$, which have been described for the first embodiment and which are disposed in a similar way relative to the preceding elements.

The system in accordance with said second embodiment has the same advantages in respect of the image quality and may be provided with the same features with respect to its adjustment to the eyesight of the user.

From this last embodiment a third embodiment may be derived by dispensing with the glass block 40 of FIG. 5. The function of said block has already been outlined hereinbefore. Omission of said block may be envisaged, but this necessitates a substantial increase of the angle A of the prism 60 if the power and angular field are to be maintained. The performance of this embodiment as regards the magnitude of the field of view is not the same as that of the preceding embodiments, but the advantage is that at least one element, which may be heavy and bulky, may be dispensed with.

What is claimed is:

1. A binocular viewing system for imaging a remote object comprising a first prism having a first planar surface receiving radiation directly from said object and having two further planar surfaces, the planes of the two further planar surfaces intersecting at a central line parallel to said first planar surface, said second surfaces being equiangularly arranged about a line, hereinafter referred to as the optic axis, perpendicular to said central line and to said first planar surface, a pair of second prisms symmetrically arranged about said central line and confronting said second surfaces of said first prism, a pair of plano convex objective lenses confronting sides of said pair of second prisms remote from said first prism, and an assembly of third prism means for directing radiation passing through said lenses into two light paths in directions parallel to said optic axis.

2. A device as claimed in claim 1, wherein the refractive index of the second prism is greater than that of the surrounding medium.

3. A device as claimed in claim 1, wherein the refractive index of the medium which surrounds the second prism is not the same at the entrance and at the exit of the prism.

4. A device as claimed in claim 1, wherein the second prism is an air prism which is disposed in glass.

5. A device as claimed in claim 2, wherein the second prism is a glass prism which is disposed in air.

6. A device as claimed in claim 1, wherein the second prism is a glass prism which is disposed in air, whose apex points towards the outside of the instrument.

7. A device as claimed in claim 1, wherein the second prism is an air prism whose top points towards the optic axis and which is disposed in glass, the entrance of said air prism being the exit of the first prism, and the exit face of each of said second prisms being the plane face of the plane-convex lens.

* * * * *